E. F. GUTH.

LIGHTING FIXTURE.

APPLICATION FILED JUNE 4, 1919.

Reissued July 1, 1919.

14,680.

Inventor

Edwin F. Guth

By Dodson & Roe

Attorney

UNITED STATES PATENT OFFICE.

EDWIN F. GUTH, OF ST. LOUIS, MISSOURI, ASSIGNOR TO LUMINOUS UNIT COMPANY, OF ST. LOUIS, MISSOURI, A CORPORATION OF MISSOURI.

LIGHTING-FIXTURE.

14,680. Specification of Reissued Letters Patent. Reissued July 1, 1919.

Original No. 1,076,418, dated October 21, 1913, Serial No. 731,981, filed November 18, 1912. Application for reissue filed June 4, 1919. Serial No. 301,596.

*To all whom it may concern:*

Be it known that I, EDWIN F. GUTH, a citizen of the United States of America, residing in the city of St. Louis, State of Missouri, have invented a certain new and useful Lighting-Fixture, of which the following is such a full, clear, and exact description as will enable anyone skilled in the art to which it appertains to make and use the same, reference being had to the accompanying drawings, forming part of this specification.

My invention relates to a lighting fixture for effecting what may be termed "semi-indirect" lighting of interiors, that is, although the fixture is designed to entirely eliminate the disadvantage of direct lighting, not all the rays are reflected.

One of the objects of my invention is to produce an even distribution of light, not only permitting some of the light to pass downward, but also directing a portion of it outwardly toward the walls of the room.

Another object of the invention is to produce a simple, inexpensive, durable fixture of attractive design which may be easily assembled or taken apart for cleaning.

I have also produced a fixture which may be constructed almost entirely from glass and thus secure freedom from rust and the best possible insulation when used for electric lighting.

The preferred manner of accomplishing the objects set forth will more fully appear in connection with the following detailed description.

Figure 1:
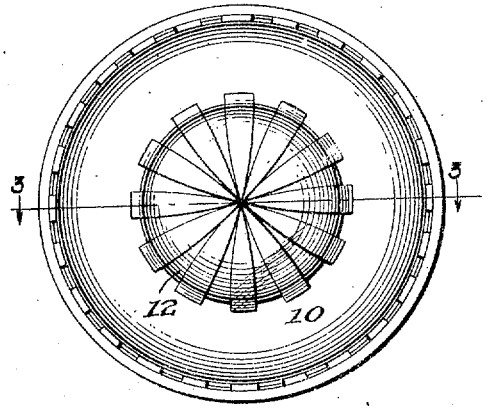
Figure 2:
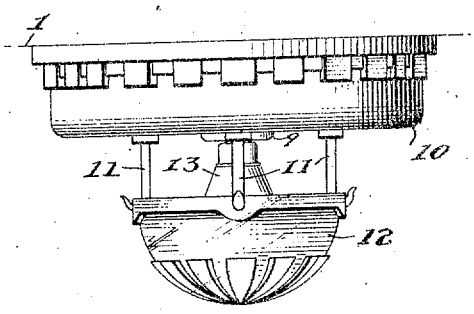
Figure 3:
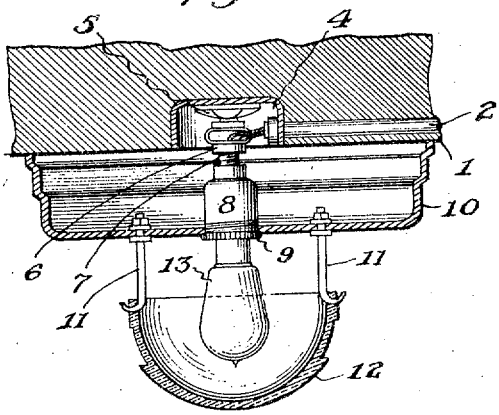
Figure 4:
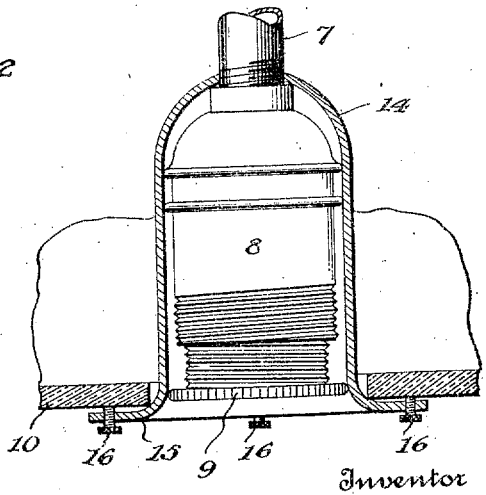

In the drawings which show one embodiment of my invention, Figure 1 is a plan view, Fig. 2 a side elevation, and Fig. 3 a view partly in cross section. Fig. 4 illustrates a modified form of canopy supporting means.

1 designates the ceiling line, 2 a wire conduit, and 4 a junction box. To the upper wall of the junction box is attached a crow foot 5, and in threaded engagement therewith is a connecting member comprising a saddle or "hickey" 6 and a nipple 7 through which electric wires may pass to the socket 8. 9 is a flange nut in threaded engagement with the socket cap and is adapted to support an opaque or translucent glass canopy 10 and to adjust it against the ceiling. This canopy is preferably cylindrical, as shown, and its upper rim bears against the ceiling, thus covering from view the wire and ceiling connections. The lower surface of the canopy is preferably flat and parallel with the ceiling and serves as a reflecting surface to reflect the rays of light both downwardly and toward the walls of the room. Supported from the canopy by the rods or wires 11 is a translucent glass bowl 12 surrounding the lamp 13. The rim of the bowl is preferably so positioned that all the rays of the light which do not pass through the bowl will strike the reflecting surface of the canopy.

Instead of the flange 9 of Fig. 3, a bell shaped member 14 supported from the nipple 7 and having a flange 15 may be used to support the canopy, as illustrated in Fig. 4. The screws 16 serve to adjust the canopy against the ceiling.

In the use of the fixture, a portion of the rays of light will pass through the bowl, being diffused and softened thereby. Other rays will be reflected from the inner reflecting surface of the bowl to the outer surface of the canopy and there reflected outward and downward and still another portion of the rays will be directly reflected by the canopy. It will thus be observed that with my improved fixture the advantages of indirect lighting will be secured regardless of the color of the walls or ceiling, and also that the light will be distributed over the entire area beneath the fixture. A further advantage of the fixture lies in the fact that it not only diffuses the light, but also directs it in a short path to the space where it is desired, thus most efficiently utilizing all the light produced by the lamp. Another valuable characteristic of my fixture is that the light from the source is handled efficiently, the rays being directed in the shortest possible path from the source to the lower portion of the room where they are of most service. The reflection of light from the walls and objects in the room to the ceiling sufficiently lights it. My fixture, therefore, handles the light much more efficiently than any other lighting fixture known to me in that it effectively brings practically all the light to the working plane first instead of directing or permitting a large portion to pass to the ceiling to be reflected thence to the working plane. Ceilings, unless specially constructed are poor reflectors and, moreover, the intensity of light decreases rapidly with increasing distance from the source.

I am aware that modifications in details of construction may be made without sacrificing the principle of my invention and I, therefore, do not desire that it be limited otherwise than by the appended claims.

Having fully described my invention, what I claim as new and desire to secure by Letters Patent of the United States is:

1. In a lighting fixture, the combination with a reflecting member having a horizontally disposed flat lower reflecting surface, of a translucent light diffusing bowl opening toward the central portion of the reflecting surface and positioned a short distance below said surface to provide free space for the passage of light between the reflecting surface and the upper edge of the bowl, the bowl opening being of smaller area than the reflecting surface, bowl suspending means attached to the upper part of the bowl, and a source of light within the bowl and near the reflecting surface, the relative position of the bowl, source of light and reflecting surface being such that all the rays of light not passing directly from the source to the inner surface of the bowl will strike the reflecting surface and be directed downward thereby.

2. In a lighting fixture, the combination with suitable ceiling connections, of a lamp socket attached thereto, a canopy covering said ceiling connections and lamp socket, said canopy having a wholly flat lower surface adapted to reflect light, a translucent light diffusing bowl positioned below and opening toward the central portion of the flat reflecting surface, the area of the bowl opening being less than that of the said reflecting surface, a lamp in the lamp receptacle and extending into the bowl, means for suspending the bowl so that light passing downwardly through it will be unobstructed, the bowl, lamp and reflecting surface being positioned with relation to each other to cause substantially all the rays of light from a lamp to be directed downwardly and distributed in a diffused condition over the entire surface of a horizontal plane beneath the fixture of a greater area than the reflecting member.

3. In a lighting fixture, a unitary structure comprising the combination with a reflecting member, of a translucent light diffusing bowl opening toward the central portion of the reflecting surface and positioned a short distance below said surface to provide free space for the passage of light between the reflecting surface and the upper edge of the bowl, the bowl opening being of smaller area than the reflecting surface, means for attaching the bowl to the reflecting member in spaced relation thereto, and a source of light within the bowl and near the reflecting surface, the relative position of the bowl, source of light and reflecting surface being such that substantially all of the rays of light not passing directly from the source to the inner surface of the bowl will strike the reflecting surface and be directed downwardly thereby.

EDWIN F. GUTH.